(12) United States Patent  
Lu (10) Patent No.: US 10,572,110 B2  
(45) Date of Patent: Feb. 25, 2020

(54) METHOD AND APPARATUS FOR ADAPTIVELY ADJUSTING USER INTERFACE

(71) Applicant: ALIBABA GROUP HOLDING LIMITED, George Town, Grand Cayman (KY)

(72) Inventor: Kun Lu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 187 days.

(21) Appl. No.: 14/863,109

(22) Filed: Sep. 23, 2015

(65) Prior Publication Data

US 2016/0092055 A1 Mar. 31, 2016

(30) Foreign Application Priority Data

Sep. 25, 2014 (CN) .......................... 2014 1 0498033

(51) Int. Cl.
```
G06F 3/0346    (2013.01)
G06F 3/01      (2006.01)
G06F 3/0484    (2013.01)
G06F 3/0481    (2013.01)
G06F 3/0487    (2013.01)
G06F 1/16      (2006.01)
G06F 9/445     (2018.01)
```
(52) U.S. Cl.
CPC .......... G06F 3/0484 (2013.01); G06F 1/1694 (2013.01); G06F 3/017 (2013.01); G06F 3/0481 (2013.01); G06F 3/0487 (2013.01); G06F 9/44505 (2013.01)

(58) Field of Classification Search
CPC ....... G06F 3/0484; G06F 3/0346; G06F 3/017
See application file for complete search history.

(56) References Cited

U.S. PATENT DOCUMENTS 8,665,238 B1  3/2014  Gossweiler, III et al.
8,743,052 B1  6/2014  Keller et al.
(Continued)

FOREIGN PATENT DOCUMENTS

CN  102375652 A  3/2012
CN  103324423 A  9/2013
(Continued)

OTHER PUBLICATIONS

PCT International Search Report and Written Opinion dated Dec. 23, 2015, issued in corresponding International Application No. PCT/US2015/51750 (10 pages).
(Continued)

*Primary Examiner* — Jennifer N To
*Assistant Examiner* — Amy P Hoang
(74) *Attorney, Agent, or Firm* — Finnegan, Henderson, Farabow, Garrett & Dunner, LLP (57) ABSTRACT

Apparatus and method are disclosed for adaptively adjusting a user interface of an intelligent terminal device. The method may include acquiring a posture parameter of the intelligent terminal device. The method may also include determining dominant hand information of a user of the intelligent terminal device based on the posture parameter. In addition, the method may include adjusting a user interface of the intelligent terminal device based on the dominant hand information of the user.

26 Claims, 5 Drawing Sheets

(56) References Cited

U.S. PATENT DOCUMENTS

| | | | |
|---|---|---|---|
| 8,760,426 B1 | 6/2014 | Strand et al. | |
| 2005/0030278 A1 | 2/2005 | Fu | |
| 2009/0249203 A1 | 10/2009 | Tsuruta et al. | |
| 2010/0269072 A1 | 10/2010 | Sakata et al. | |
| 2010/0315266 A1 | 12/2010 | Gunawardana et al. | |
| 2012/0100889 A1* | 4/2012 | Kim | G06F 1/1694 455/556.1 |
| 2012/0162078 A1 | 6/2012 | Ferren et al. | |
| 2013/0249950 A1 | 9/2013 | Mahmoud et al. | |
| 2014/0085220 A1* | 3/2014 | Gossweiler, III | G06F 3/0488 345/173 |
| 2014/0229848 A1 | 8/2014 | Zhang et al. | |
| 2014/0306938 A1* | 10/2014 | Block | G06F 3/017 345/178 |
| 2015/0116281 A1* | 4/2015 | Sata | G06F 3/0488 345/178 |
| 2015/0149941 A1* | 5/2015 | Itagaki | G06F 3/04817 715/765 |
| 2015/0161885 A1* | 6/2015 | Wang | G06F 1/1694 340/5.1 |
| 2015/0324070 A1 | 11/2015 | Kim et al. | |
| 2015/0346994 A1 | 12/2015 | Chanyontpatanakul | |

FOREIGN PATENT DOCUMENTS

| | | |
|---|---|---|
| JP | 2008-015679 A | 1/2008 |
| WO | WO 2014/135088 A1 | 9/2014 |

OTHER PUBLICATIONS

SIPO Search Report issued in Chinese Application No. 201410498033.3, dated Jan. 17, 2018, 1 page.

First Chinese Office Action issued in Chinese Application No. 201410498033.3, dated Jan. 25, 2018, 16 pages.

* cited by examiner

METHOD AND APPARATUS FOR ADAPTIVELY ADJUSTING USER INTERFACE

CROSS REFERENCE TO RELATED APPLICATION

The present application claims the benefits of priority to Chinese Application No. 201410498033.3, filed Sep. 25, 2014, the entire content of which is incorporated herein by reference.

TECHNICAL FIELD

The present application relates to the field of user interface control technologies of intelligent terminal devices, and more particularly, to a method and an apparatus for adaptively adjusting a user interface of an intelligent terminal device.

BACKGROUND

About 10% to 12% of people on the earth are left-handed (commonly known as left-handers). However, almost all software application (APP) User Interfaces (UIs) of intelligent terminal devices are designed for the convenience of right-handed people. As a result, for left-handers, current APP UIs of intelligent terminal devices are inconvenient to use, leading to poor user experience.

SUMMARY

In one aspect, the present disclosure is directed to a method for adaptively adjusting a user interface of an intelligent terminal device. The method may include acquiring a posture parameter of the intelligent terminal device. The method may also include determining dominant hand information of a user of the intelligent terminal device based on the posture parameter. In addition, the method may include adjusting a user interface of the intelligent terminal device based on the dominant hand information of the user.

In another aspect, the present disclosure is directed to an apparatus. The apparatus may include a memory device and a processor device communicatively coupled to the memory device. The processor device may be configured to acquire a posture parameter of the apparatus. The processor device may also be configured to determine dominant hand information of a user of the apparatus based on the posture parameter. In addition, the processor device may be configured to adjust a user interface of the apparatus based on the dominant hand information of the user.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

Figure 1:
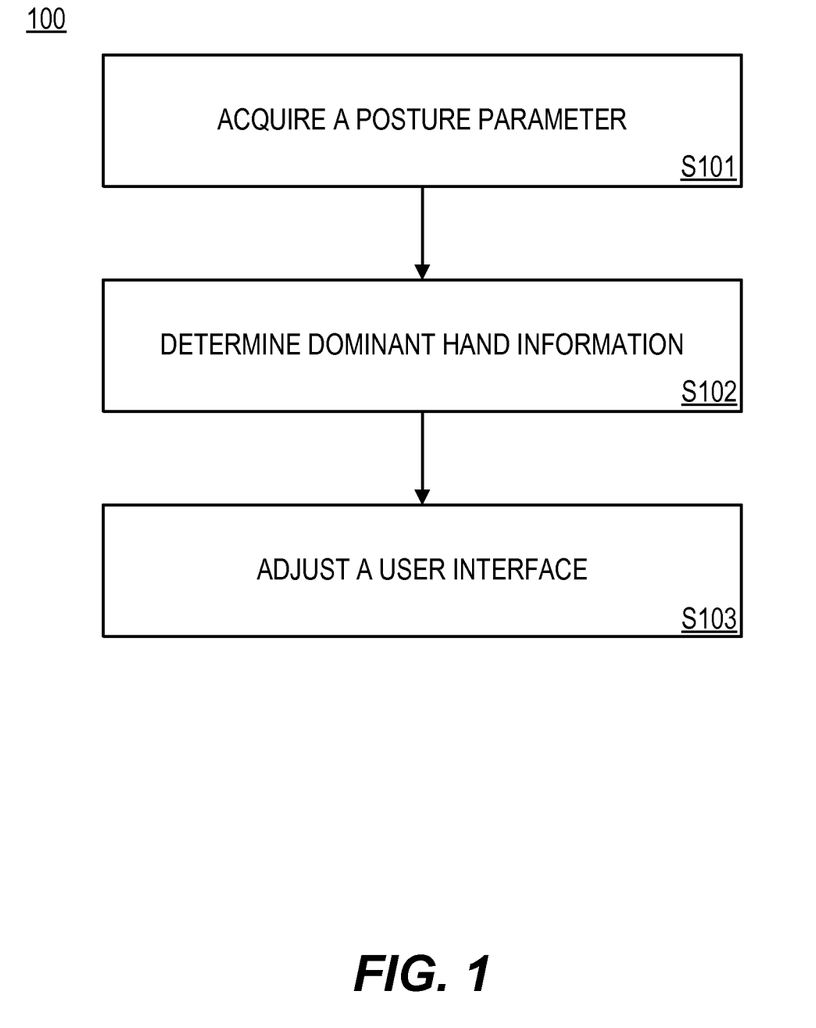
FIG. 1 is a flow chart of an exemplary method for adaptively adjusting a user interface of an intelligent terminal device, according to an embodiment of the present application.

FIG. 1 a flow chart of an exemplary method 100 for adaptively adjusting a user interface of an intelligent terminal device. Method 100 may include a series of steps. Some steps may be optional.

In step S101, a posture parameter of the intelligent terminal device may be acquired. The posture parameter may include a yaw angle a of the intelligent terminal device. In another example, the posture parameter may include a roll angle y of the intelligent terminal device. In a further example, the posture parameter may include both the yaw angle $\alpha$ and the roll angle $\gamma$ of the intelligent terminal device. Both the yaw angle $\alpha$ and the roll angle $\gamma$ can be detected by a direction sensor of the intelligent terminal device. Acquisition of the posture parameter may be performed when the user is using the intelligent terminal device, such as when the user is making a phone call when the intelligent terminal device is a cell phone. The posture parameter may be acquired multiple times. For example, the posture parameter may be acquired a predetermined times, such as 100 times. In addition, whether the intelligent terminal device is being used to make a call can be determined by reading call status data using a Software Development Kit (SDK) interface of the operating system of the intelligent terminal device.

Figure 2:
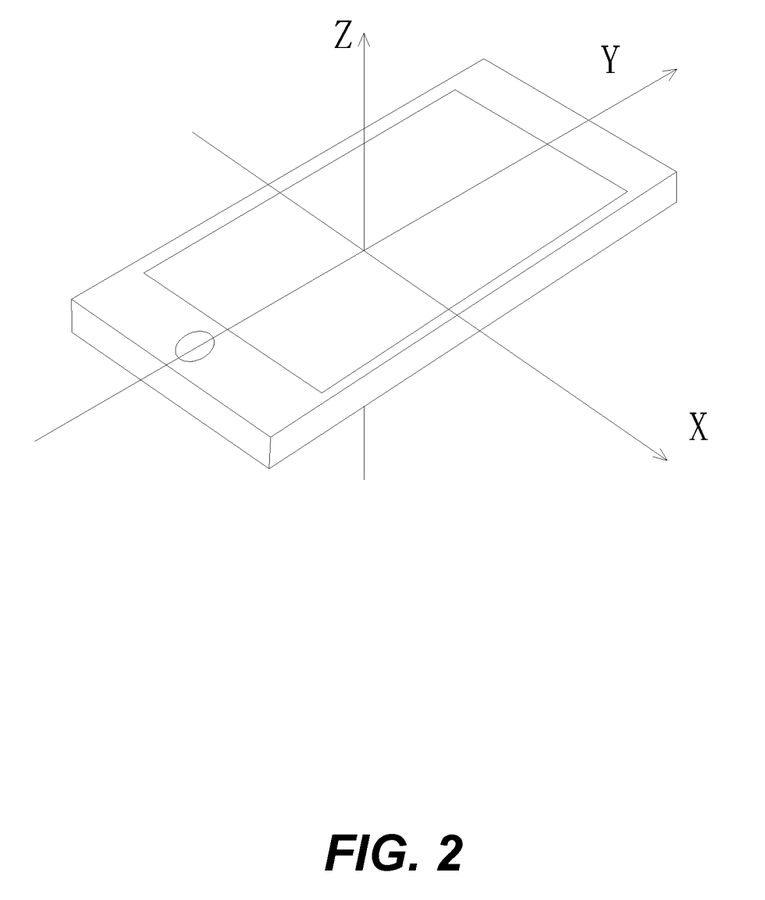
FIG. 2 is a three-axial schematic diagram of an intelligent terminal device, according to an embodiment of the present application.

FIG. 2 shows an intelligent terminal device in a three-axial space. For ease of description, it is assumed that extending directions of the width, length, and thickness of the intelligent terminal device correspond to the X-axis, Y-axis, and Z-axis shown in FIG. 2, respectively. An initial posture of the intelligent terminal device can be defined when: the positive direction of the X-axis points to the right of the intelligent terminal device (e.g., to the east), the positive direction of the Y-axis points to the head or the upper portion of the intelligent terminal device (e.g., to the north), and the positive direction of the Z-axis is perpendicular to the plane of the screen of the intelligent terminal device (e.g., the horizontal plane) and points up (e.g., to the sky). Starting from the initial posture, the yaw angle can be defined as a rotation angle by which the intelligent terminal device rotates horizontally around the Z-axis relative to the initial posture (assume that the clockwise rotation is positive), where the value of the yaw angle can range from 0° to 360°. For example, when the Y-axis points to the north, the yaw angle can be defined as 0°, and when the Y-axis points to the south, the yaw angle can be defined as 180°. Similarly, when the Y-axis points to the east, the yaw angle can be defined as 90°, and when the Y-axis points to the west, the yaw angle can be defined as 270°.

A pitch angle can be defined as a rotation angle by which the intelligent terminal device rotates around the X-axis up and down relative to the initial posture (assume that the rotation of the head or upper portion of the intelligent terminal device towards the positive direction of the Z-axis is positive). The value of the pitch angle may range from −180° to 180°.

The roll angle can be defined as a rotation angle by which the intelligent terminal device rotates around the Y-axis left and right relative to the initial posture (assume that the rotation of the screen side towards the positive direction of the X-axis is positive, and the rotation of the screen side towards the negative direction of the X-axis is negative). The value of the roll angle may range from −90° to 90°.

In some embodiments, the yaw angle, the pitch angle, and the roll angle can all be detected by a direction sensor of the intelligent terminal device. Posture parameters may be collected when the user is in a normal standing or sitting position. When the user is not in the normal standing or sitting position (e.g., when the user is lying down or making calls with an headphone on), posture parameter may not be collected.

In step S102, a processor device of the intelligent terminal device may determine the dominant hand information of the user according to the posture parameter. In some embodiments, the posture parameter may include the yaw angle a of the intelligent terminal device. If the yaw angle $\alpha$ is in a range of $0°<\alpha<90°$, the processor device may determine that the user of the intelligent terminal device uses his/her right hand to hold the intelligent terminal device, as shown on the right side of FIG. 3. On the other hand, if the yaw angle a is in a range of $270°<\alpha<360°$, the processor device may determine that the user of the intelligent terminal device uses his/her left hand to hold the intelligent terminal device, as shown on the left side of FIG. 3. The determination may be made while the user is making a call while holding the intelligent terminal device with either his/her right or left hand.

Figure 3:
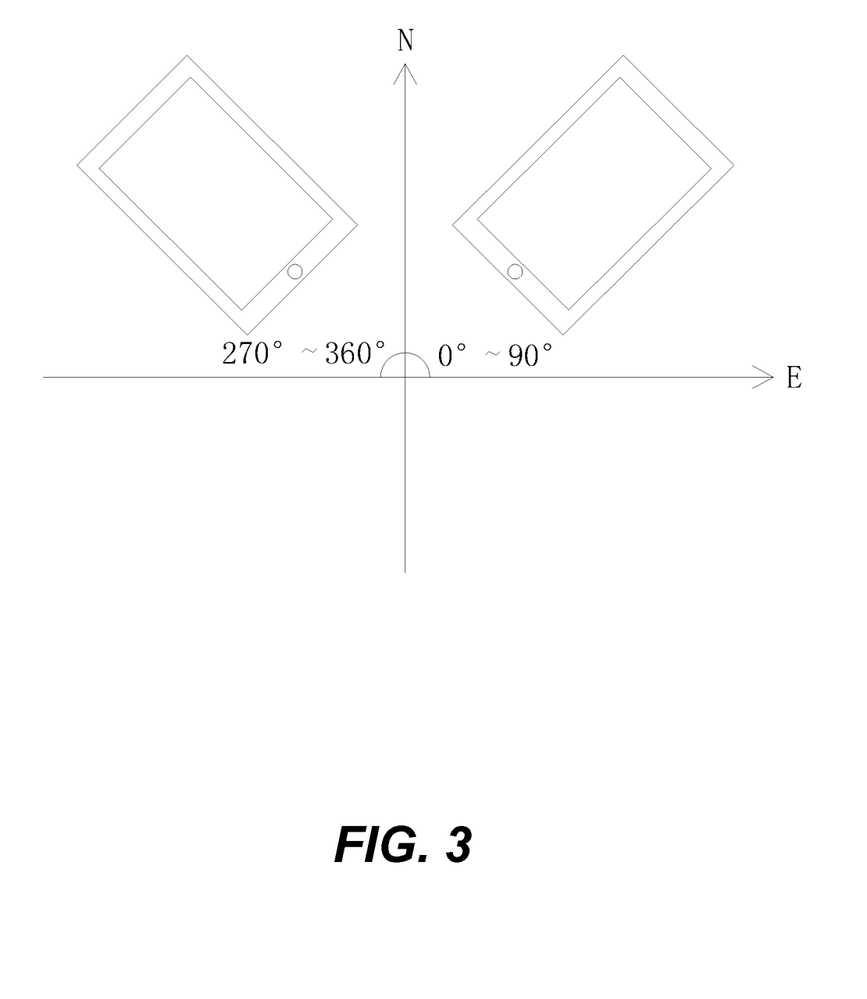
FIG. 3 is a schematic diagram showing an intelligent terminal device rotating horizontally around the Z-axis, according to an embodiment of the present application.

In some embodiments, the posture parameter may include the roll angle $\gamma$ of the intelligent terminal device. If the roll angle $\gamma$ is in a range of $-90°<\gamma<0°$, the processor device may determine that the user of the intelligent terminal uses his/her left hand to hold the intelligent terminal device. On the other hand, if the roll angle $\gamma$ is in a range of $0°<\gamma<90°$, the processor device may determine that the user of the intelligent terminal uses his/her right hand to hold the intelligent terminal device. Similar to the determination process based on the yaw angle, the determination process based on the roll angle may be performed while the user is making a call while holding the intelligent terminal device with either his/her right or left hand.

Regardless of whether the yaw angle $\alpha$ or the roll angle $\gamma$ is used to determine the left/right hand, such determination process may be made multiple times. For example, the direction sensor may detect a plurality of posture parameters during a series of events. For each acquired posture parameter, the processor device may determine whether the user uses the right or left hand to hold the intelligent terminal device. Assume that a total number of N posture parameters are acquired, for each of the N posture parameters, a determination process is carried out to determine whether the user uses his/her left or right hand to hold the intelligent terminal device. There may be L number of times that the processor determines that left hand is used and R number of times that the processor determines that right hand is used.

If a ratio of L/N, indicating that the number of times that left hand is used over the total number of times the posture parameter is acquired, is greater than a preset threshold (e.g., 80%), or if L>R, the processor device may determine that the dominant hand of the user of the intelligent terminal device is the left hand.

Similarly, If a ratio of R/N, indicating that the number of times that right hand is used over the total number of times the posture parameter is acquired, is greater than a preset threshold (e.g., 80%), or if R>L, the processor device may determine that the dominant hand of the user of the intelligent terminal device is the right hand.

In Step S103, the processor device may adaptively adjust the user interface of the intelligent terminal device based on the dominant hand information of the user. For example, if it is determined that the dominant hand of the user is the left hand, the user interface of the intelligent terminal device may be adjusted from a right-hand mode (e.g., when the right-hand mode is the default setting) to a left-hand mode. If it is determined that the dominant hand of the user is the right hand, it may not be necessary to make an adjustment if the right-hand mode is the default setting. In this way, for each user, a personalized user interface conforming to the dominant hand of the user may be provided, making it more convenient for any user, especially the left-handers, to use the intelligent terminal device. User experience may be improved.

Figure 4A:
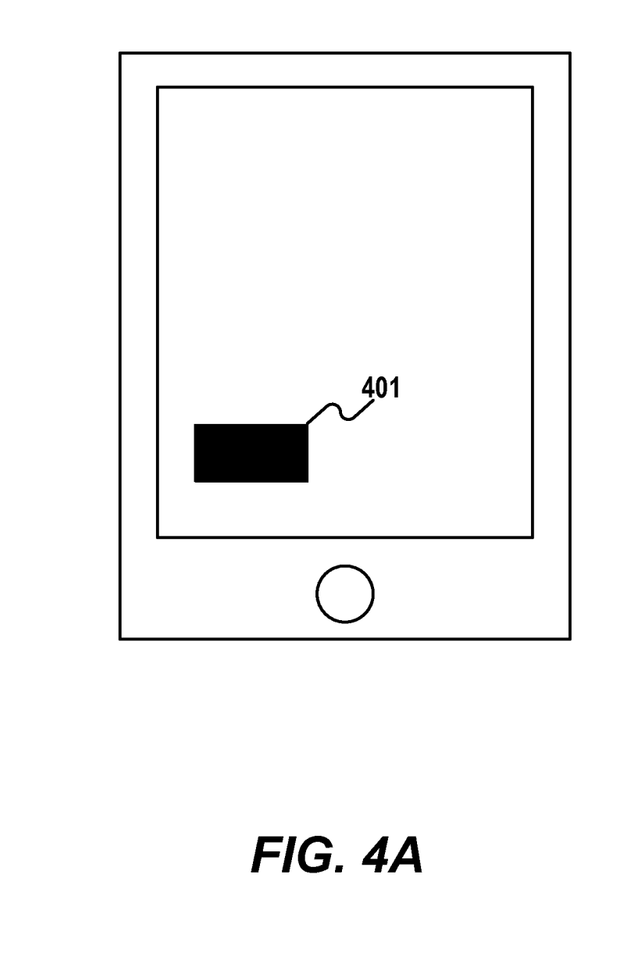
FIG. 4A is a schematic diagram of an exemplary display position of a UI control element on a display screen of an intelligent terminal device in a left-hand mode.
Figure 4B:
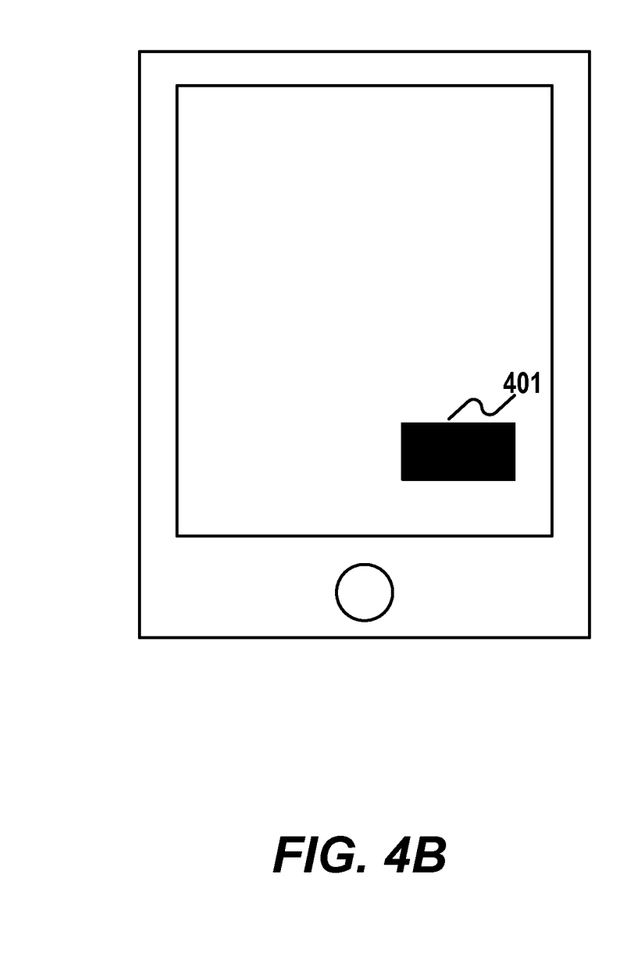
FIG. 4B is a schematic diagram of an exemplary display position of a UI control element on a display screen of an intelligent terminal device in a right-hand mode.

In some embodiments, the user interface of the intelligent terminal device may be by default in the right-hand mode. A left-hand mode may be provided by mirroring (e.g., left-right mirroring) the display settings of the right-hand mode. Both the right-hand mode and the left-hand mode may be provided as configuration files in advance. The right-hand mode or the left-hand mode can be selected according to the result of the determination process described above. As shown in FIGS. 4A and 4B, display positions of a same UI control element (e.g., the black blocks 401 shown in FIGS. 4A and 4B) on the screen of the intelligent terminal device in the two different modes may be symmetric with respect to the central vertical axis of the screen.

In some embodiments, the user interface of the intelligent terminal device may be a user interface of an APP of the intelligent terminal. In this case, once the mode is adjusted, even after the APP is restarted, the APP may remember the mode preference and display the adjusted user interface. In some embodiments, the user interface of the intelligent terminal device may be a user interface of an operating system of the intelligent terminal device. In this case, once the mode is adjusted, even after system reboot, the system may remember the mode preference and display the adjusted user interface.

An exemplary code illustrating the disclosed method is provided as follow, in which yaw angle $\alpha$ is used in the determination of the dominant hand.

```
public class SensorActivity extends Activity implements
SensorEventListener {
    private SensorManager mSensorManager;
    private Sensor mOrientation;
    @Override
```

```
public void onCreate(Bundle savedInstanceState) {
  super.onCreate(savedInstanceState);
  setContentView(R.layout.main);
    mSensorManager = (SensorManager)
getSystemService(Context.SENSOR_SERVICE);
    mOrientation =
mSensorManager.getDefaultSensor(Sensor.TYPE_ORIENTATION);
  }
  @Override
  public void onAccuracyChanged(Sensor sensor, int accuracy) {
    //....
  }
  @Override
  protected void onResume( ) {
    super.onResume( );
    mSensorManager.registerListener(this, mOrientation,
SensorManager.SENSOR_DELAY_NORMAL);
  }
  @Override
  protected void onPause( ) {
    super.onPause( );
    mSensorManager.unregisterListener(this);
  }
  @Override
  public void onSensorChanged(SensorEvent event) {
    float yaw_angle = event.values[0]; //yaw angle
    float pitch_angle = event.values[1]; //pitch angle
    float roll_angle = event.values[2]; //roll angle
    // Determination can be made using these angles
    if (0<azimuth_angle<90 ){
      //....
      Lefthand_count+=1; //Left hand count is increased by 1
    }
    else if (270<azimuth_angle<360){
      //...
      Righthand_count+=1; //Right hand count is increased by 1
    }else{
        //Other cases are not counted, as the user's body may be in a
strange position when receiving the call or the call is answered using a
headphone.
    }
  }
}
```

Figure 5:
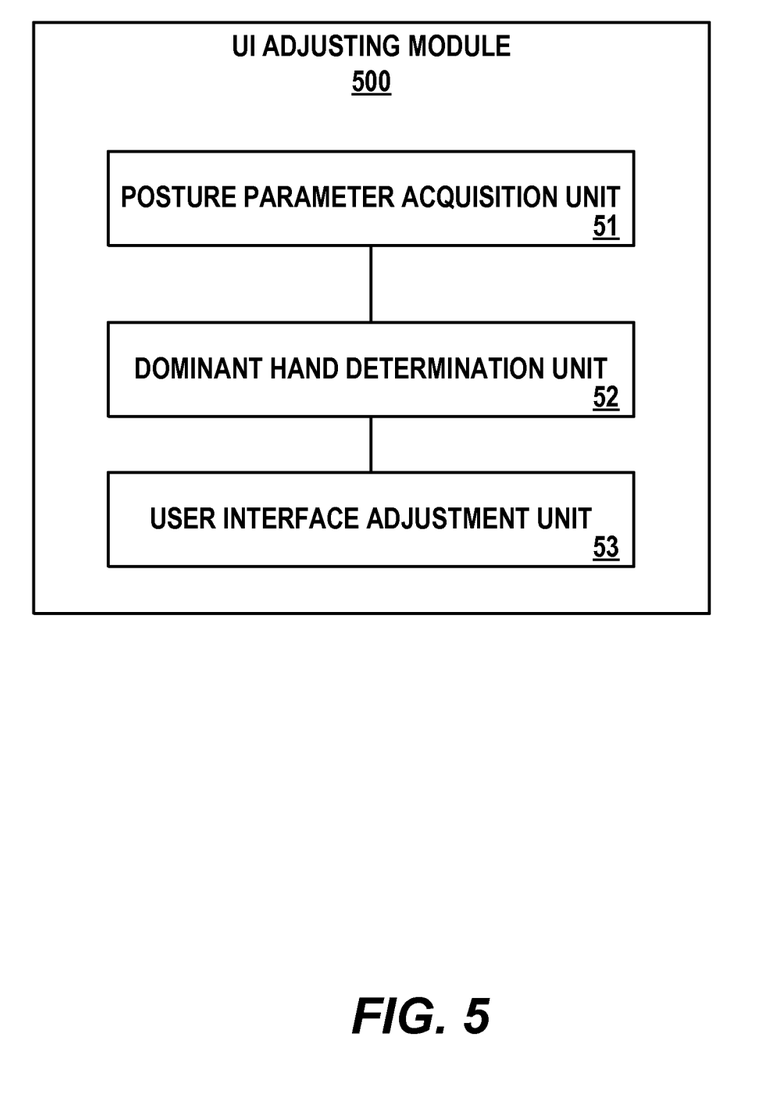
FIG. 5 is a logic structural block diagram of an exemplary UI adjusting module, according to an embodiment of the present application.

FIG. 5 is a logic structural block diagram of an exemplary UI adjusting module 500. UI adjusting module 500 may be implemented using software code instructions stored on a memory device of the intelligent terminal device. The processor device of the intelligent terminal device may execute the instructions to perform the various functions disclosed above. UI adjusting module 500 may include several functional units. Referring to FIG. 5, UI adjusting module 500 may include a posture parameter acquisition unit 51, a dominant hand determination unit 52, and a user interface adjustment unit 53.

Posture parameter acquisition unit 51 may be configured to acquire a posture parameter of the intelligent terminal device, as discussed above in connection with FIGS. 1-3 and 4A-4B.

Dominant hand determination unit 52 may be configured to determine dominant hand information of the user of the intelligent terminal device based on the posture parameter, as discussed above in connection with FIGS. 1-3 and 4A-4B.

User interface adjustment unit 53 may be configured to adaptively adjust a user interface of the intelligent terminal device based on the dominant hand information of the user, as discussed above in connection with FIGS. 1-3 and 4A-4B.

The disclosed methods and functions may be implemented using software code instructions stored in a memory device, and executed by a processor device. The processor device may include a general purpose processor, a digital signal processor, an application specific integrated circuit (ASIC), a field programmable gate array or other programmable logic apparatuses, a discrete gate or transistor logic, a discrete hardware component, or a design combining any of those described above. The general purpose processor may be a microprocessor or any conventional processor, controller, microcontroller or state machine. The processor device may also be implemented using a combination of computing apparatuses, for example, a digital signal processor and a microprocessor, multiple microprocessors, one or more microprocessors combined with a digital signal processor core, or any other similar configuration.

The steps of the method or algorithms described in the embodiments of the present invention may be embedded into hardware, a software module executed by the processor device, or a combination thereof. The software module may be stored in a memory device, such as a random access memory (RAM), a flash memory, a read-only memory (ROM), an erasable programmable read only memory (EPROM), an electrically erasable programmable read-only memory (EEPROM), a register, a hard disk, a removable disk, a compact disc read-only memory (CD-ROM), or a storage medium of any other form in the field. The storage medium may be connected to the processor device, so that the processor device can read information from the storage medium and write information into the storage medium. The storage medium may be integrated in the processor device. The processor device and the storage medium may be disposed in the ASIC, and the ASIC may be disposed in a user terminal. The processor device and the storage medium may also be disposed in different components of the user terminal.

The specification has described apparatuses and methods for adaptively adjusting user interfaces. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for adaptively adjusting a user interface of an intelligent terminal device, the method comprising:
   acquiring a posture parameter of the intelligent terminal device, wherein the posture parameter includes a yaw angle of the intelligent terminal device;
   in response to acquiring the posture parameter of the intelligent terminal device, determining, by a processor device of the intelligent terminal device, dominant hand information of a user of the intelligent terminal device based on the posture parameter, wherein determining the dominant hand information of the user of the intelligent terminal device comprises:
      determining that the user of the intelligent terminal device uses the right hand if a value of the yaw angle is in a range from 0° to 90°, and
      determining that the user of the intelligent terminal device uses the left hand if a value of the yaw angle is in a range from 270° to 360°,
   acquiring a plurality of yaw angles during a series of events;
   for each acquired yaw angle, determining whether the user of the intelligent terminal device uses the right or the left hand;
   determining a first number of times that the left hand is determined to be used and a second number of times that the right hand is determined to be used among a total number of acquired yaw angles;
   determining the dominant hand information of the user, wherein:
      the dominant hand of the user is the right hand if a ratio of the second number to the total number of acquired yaw angles is greater than a second preset threshold or if the second number is greater than the first number, or the dominant hand of user is the left hand if a ratio of the first number to the total number of acquired yaw angles is greater than a first preset threshold or if the first number is greater than the second number; and
   adjusting a user interface of the intelligent terminal device based on the dominant hand information of the user.

2. The method of claim 1, wherein the posture parameter includes a roll angle of the intelligent terminal device.

3. The method of claim 2, comprising:
   determining that the user of the intelligent terminal device uses the right hand if the roll angle is within a first range; and
   determining that the user of the intelligent terminal device uses the left hand if the roll angle is within a second range.

4. The method of claim 3, comprising:
   acquiring a plurality of roll angles during a series of events;
   for each acquired roll angle, determining whether the user of the intelligent terminal device uses the right or the left hand;
   determining a third number of times that the left hand is determined to be used and a fourth number of times that the right hand is determined to be used among a total number of acquired roll angles;
   determining the dominant hand information of the user, wherein:
      the dominant hand of the user is the right hand if a ratio of the fourth first number to the total number of acquired roll angles is greater than a fourth preset threshold or if the fourth number is greater than the third number, or the dominant hand of the user is the left hand if a ratio of the third number to the total number of acquired roll angles is greater than a third preset threshold or if to the third number is greater than the fourth number.

5. The method of claim 1, comprising:
   when it is determined that the dominant hand of the user is the left hand, adjusting the user interface of the intelligent terminal device from a right-hand mode to a left-hand mode.

6. The method of claim 1, wherein the user interface of the intelligent terminal device includes a user interface of a software application or a user interface of an operating system.

7. The method of claim 1, comprising:
   detecting, by a direction sensor of the intelligent terminal device, the yaw angle.

8. The method of claim 2, comprising:
   detecting, by a direction sensor of the intelligent terminal device, the roll angle.

9. An apparatus, comprising:
   a memory device; and
   a processor device communicatively coupled to the memory device, wherein the processor device is configured to cause the apparatus to:
      acquire a posture parameter of the apparatus, wherein the posture parameter includes a yaw angle of the apparatus;
      in response to acquiring the posture parameter of the apparatus, determine dominant hand information of a user of the apparatus based on the posture parameter, wherein in determining the dominant hand information of the user of the apparatus, the processor device is configured to:
         determine that the user of the apparatus uses the right hand if a value of the yaw angle is in a range from 0° to 90°, and
         determine that the user of the apparatus uses the left hand if a value of the yaw angle is in a range from 270° to 360°,
      acquire a plurality of yaw angles during a series of events;
      for each acquired yaw angle, determine whether the user of the intelligent terminal device uses the right or the left hand;
      determine a first number of times that the left hand is determined to be used and a second number of times that the right hand is determined to be used among a total number of acquired yaw angles;

in response to a ratio of the first number to the total number of acquired yaw angles being greater than a first preset threshold, or in response to the first number being greater than the second number, determine that the dominant hand of the user is the left hand;
in response to a ratio of the second number to the total number of acquired yaw angles being greater than a second preset threshold, or in response to the second number being greater than the first number, determine that the dominant hand of the user is the right hand; and
adjust a user interface of the apparatus based on the dominant hand information of the user.

10. The apparatus of claim 9, wherein the posture parameter includes a roll angle of the intelligent terminal device.

11. The apparatus of claim 10, wherein the processor device is configured to cause the apparatus to:
determine that the user of the apparatus uses the right hand if the roll angle is within a first range; and
determine that the user of the apparatus uses the left hand if the roll angle is within a second range.

12. The apparatus of claim 11, wherein the processor device is configured to cause the apparatus to:
acquire a plurality of roll angles during a series of events;
for each acquired roll angle, determine whether the user of the apparatus uses the right or the left hand;
determine a third number of times that the left hand is determined to be used and a fourth number of times that the right hand is determined to be used among a total number of acquired roll angles;
if a ratio of the third number to the total number of acquired roll angles is greater than a third preset threshold, or if the third number is greater than the fourth number, determine that the dominant hand of the user is the left hand; and
if a ratio of the fourth number to the total number of acquired roll angles is greater than a fourth preset threshold, or if the second number is greater than the third number, determine that the dominant hand of the user is the right hand.

13. The apparatus of claim 9, wherein the processor device is configured to cause the apparatus to:
when it is determined that the dominant hand of the user is the left hand, adjusting the user interface of the apparatus from a right-hand mode to a left-hand mode.

14. The apparatus of claim 9, wherein the apparatus is an intelligent terminal device and the user interface of the apparatus includes a user interface of a software application or a user interface of an operating system.

15. The apparatus of claim 9, further comprising:
a direction sensor configured to detect the yaw angle.

16. The apparatus of claim 10, further comprising:
a direction sensor configured to detect the roll angle.

17. A non-transitory computer-readable storage medium having stored therein instructions that are executable by one or more processors of an intelligent terminal device to cause the intelligent terminal device to perform a method comprising:
acquire acquiring a posture parameter of the intelligent terminal device, wherein the posture parameter includes a yaw angle of the intelligent terminal device;
in response to acquiring the posture parameter of the intelligent terminal device, determining, by a processor device of the intelligent terminal device, dominant hand information of a user of the intelligent terminal device based on the posture parameter, wherein determining the dominant hand information of the user of the intelligent terminal device comprises:
determining that the user of the intelligent terminal device uses the right hand if a value of the yaw angle is in a range from 0° to 90°, and
determining that the user of the intelligent terminal device uses the left hand if a value of the yaw angle is in a range from 270° to 360°,
acquiring a plurality of yaw angles during a series of events;
for each acquired yaw angle, determining whether the user of the intelligent terminal device uses the right or the left hand;
determining a first number of times that the left hand is determined to be used and a second number of times that the right hand is determined to be used among a total number of acquired yaw angles;
in response to a ratio of the first number to the total number of acquired yaw angles being greater than a first preset threshold, or in response to the first number being greater than the second number, determining that the dominant hand of the user is the left hand;
in response to a ratio of the second number to the total number of acquired yaw angles being greater than a second preset threshold, or in response to the second number being greater than the first number, determining that the dominant hand of the user is the right hand; and
adjusting a user interface of the intelligent terminal device based on the dominant hand information of the user.

18. The non-transitory computer readable medium of claim 17, wherein the posture parameter includes a roll angle of the intelligent terminal device.

19. The non-transitory computer readable medium of claim 18, wherein the instructions are executable by the one or more processors of the intelligent terminal device to cause the intelligent terminal device to further perform:
determining that the user of the intelligent terminal device uses the right hand if the roll angle is within a first range; and
determining that the user of the intelligent terminal device uses the left hand if the roll angle is within a second range.

20. The non-transitory computer readable medium of claim 19, wherein the instructions are executable by the one or more processors of the intelligent terminal device to cause the intelligent terminal device to further perform:
acquiring a plurality of roll angles during a series of events;
for each acquired roll angle, determining whether the user of the intelligent terminal device uses the right or the left hand;
determining a third number of times that the left hand is determined to be used and a fourth number of times that the right hand is determined to be used among a total number of acquired roll angles;
if a ratio of the third number to the total number of acquired roll angles is greater than a third preset threshold, or if the third number is greater than the fourth number, determining that the dominant hand of the user is the left hand; and
if a ratio of the fourth number to the total number of acquired roll angles is greater than a fourth preset threshold, or if the second number is greater than the third number, determining that the dominant hand of the user is the right hand.

21. The non-transitory computer readable medium of claim 17, wherein the instructions are executable by the one or more processors of the intelligent terminal device to cause the intelligent terminal device to further perform:

when it is determined that the dominant hand of the user is the left hand, adjusting the user interface of the intelligent terminal device from a right-hand mode to a left-hand mode.

22. The non-transitory computer readable medium of claim 17, wherein the user interface of the intelligent terminal device includes a user interface of a software application or a user interface of an operating system.

23. The non-transitory computer readable medium of claim 17, wherein the instructions are executable by the one or more processors of the intelligent terminal device to cause the intelligent terminal device to further perform:

detecting, by a direction sensor of the intelligent terminal device, the yaw angle.

24. The non-transitory computer readable medium of claim 18, wherein the instructions are executable by the one or more processors of the intelligent terminal device to cause the intelligent terminal device to further perform:

detecting, by a direction sensor of the intelligent terminal device, the roll angle.

25. The method of claim 1, wherein the posture parameter of the intelligent terminal device is acquired when the intelligent terminal device is being used to make a call based on user being in a standing or sitting position.

26. The method of claim 25, wherein the posture parameter of the intelligent terminal device is not acquired when the intelligent terminal device is being used to make a call based on a user being in a lying down position.

* * * * *

UNITED STATES PATENT AND TRADEMARK OFFICE
CERTIFICATE OF CORRECTION

| | | |
|---|---|---|
| PATENT NO. | : 10,572,110 B2 | Page 1 of 1 |
| APPLICATION NO. | : 14/863109 | |
| DATED | : February 25, 2020 | |
| INVENTOR(S) | : Kun Lu | |

It is certified that error appears in the above-identified patent and that said Letters Patent is hereby corrected as shown below:

On the Title Page

Item (30), in the Foreign Application Priority Data, "2014 1 0498033" should read --201410498033.3--.

In the Claims

In Claim 1, Column 7, Line 55, "hand of user" should read --hand of the user--.

In Claim 4, Column 8, Line 17, "the fourth first number" should read --the fourth number--.

In Claim 4, Column 8, Line 23, "if to the third number" should read --if the third number--.

In Claim 17, Column 9, Line 58, "acquire acquiring a posture parameter" should read --acquiring a posture parameter--.

In Claim 25, Column 11, Line 26, "on user" should read --on a user--.

Signed and Sealed this
Thirty-first Day of October, 2023

Katherine Kelly Vidal
*Director of the United States Patent and Trademark Office*